(12) United States Patent
Dzioba

(10) Patent No.: US 6,907,370 B2
(45) Date of Patent: Jun. 14, 2005

(54) METHOD AND APPARATUS FOR CALIBRATING A MEASUREMENT SYSTEM

(75) Inventor: Daryl James Dzioba, Saugus, CA (US)

(73) Assignee: JMAR Precision Systems, Inc., Chatsworth, CA (US)

( * ) Notice: Subject to any disclaimer, the term of this patent is extended or adjusted under 35 U.S.C. 154(b) by 0 days.

(21) Appl. No.: 10/294,147

(22) Filed: Nov. 14, 2002

(65) Prior Publication Data

US 2003/0120447 A1 Jun. 26, 2003

Related U.S. Application Data

(60) Provisional application No. 60/335,135, filed on Nov. 14, 2001.

(51) Int. Cl.[7] .............................................. G06F 19/00
(52) U.S. Cl. .......................... 702/85; 702/90; 702/189; 356/243.8; 382/165
(58) Field of Search .............................. 702/85, 20, 91, 702/189, 104, 107, 134; 382/162, 165; 356/243.8

(56) References Cited

U.S. PATENT DOCUMENTS 4,574,393 A * 3/1986 Blackwell et al. .......... 382/162
5,850,472 A * 12/1998 Alston et al. ............... 382/162

* cited by examiner

Primary Examiner—Bryan Bui
(74) Attorney, Agent, or Firm—Baker & McKenzie LLP

(57) ABSTRACT

A method and apparatus for calibrating a measurement system are provided. The method and apparatus compensate not only for lamp variations, but also for camera and optics variations. The system can be readily implemented and can be ported from one measurement system to another. One embodiment of the improved calibration system addresses the issue of variations between light sources by employing an automated lamp calibration system. One method calibrates existing or new lamps to match an established standard. In a preferred embodiment, the method will generate a reference table, for a measurement system defined as the standard, to act as the reference for all measurement systems. The reference table may be in the form of a data file that may be subsequently copied to other measurement systems. The reference table can then act as a global standard for other measurement systems, including future systems not yet made.

13 Claims, 6 Drawing Sheets

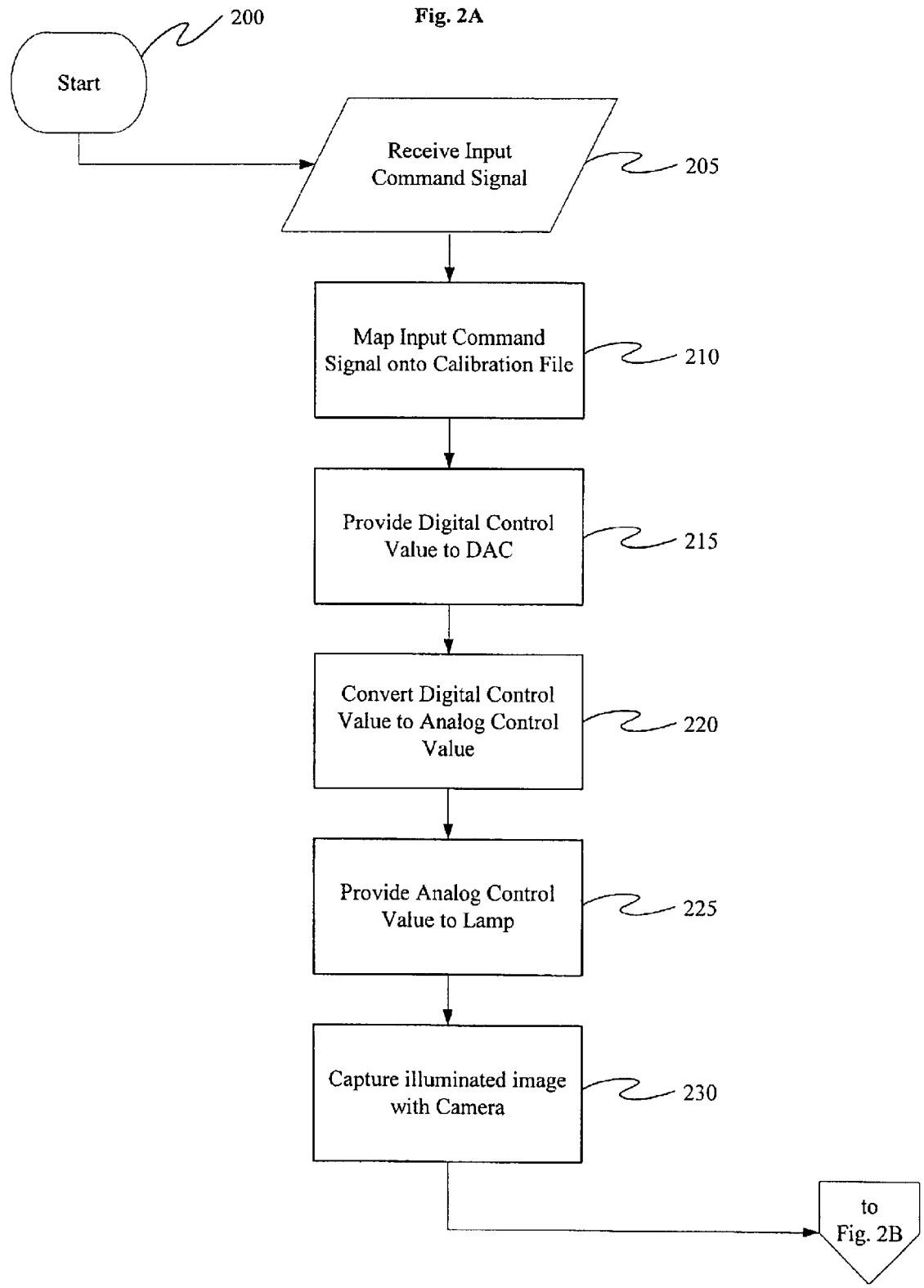

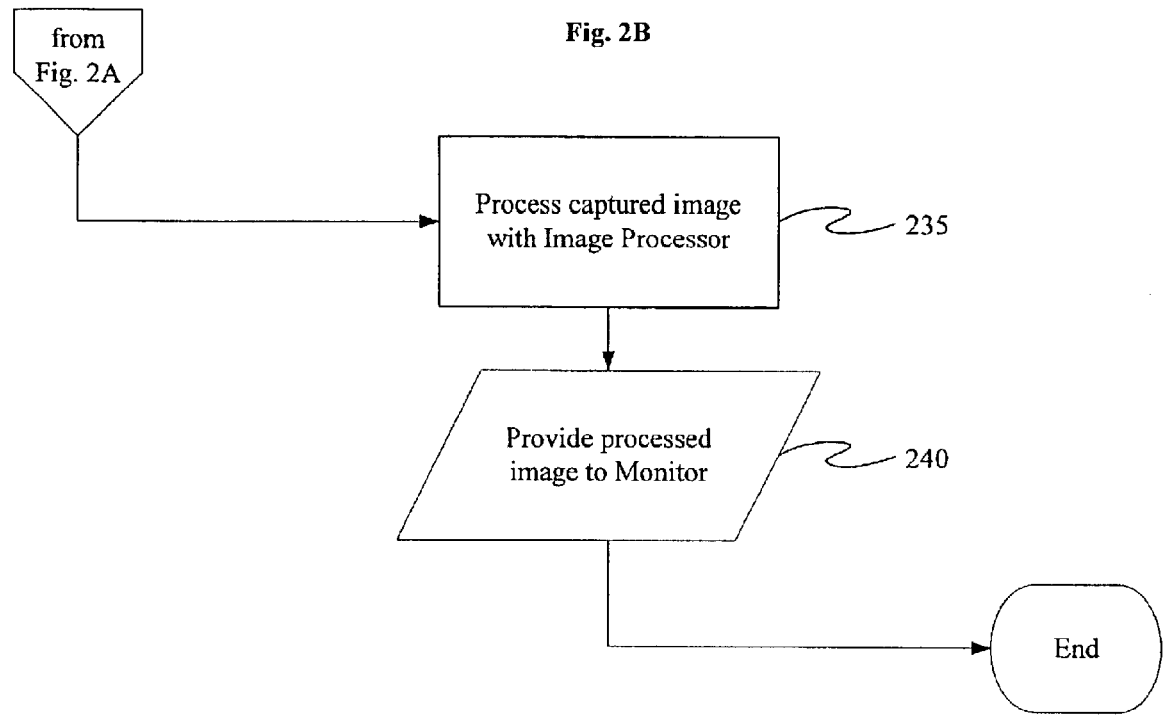

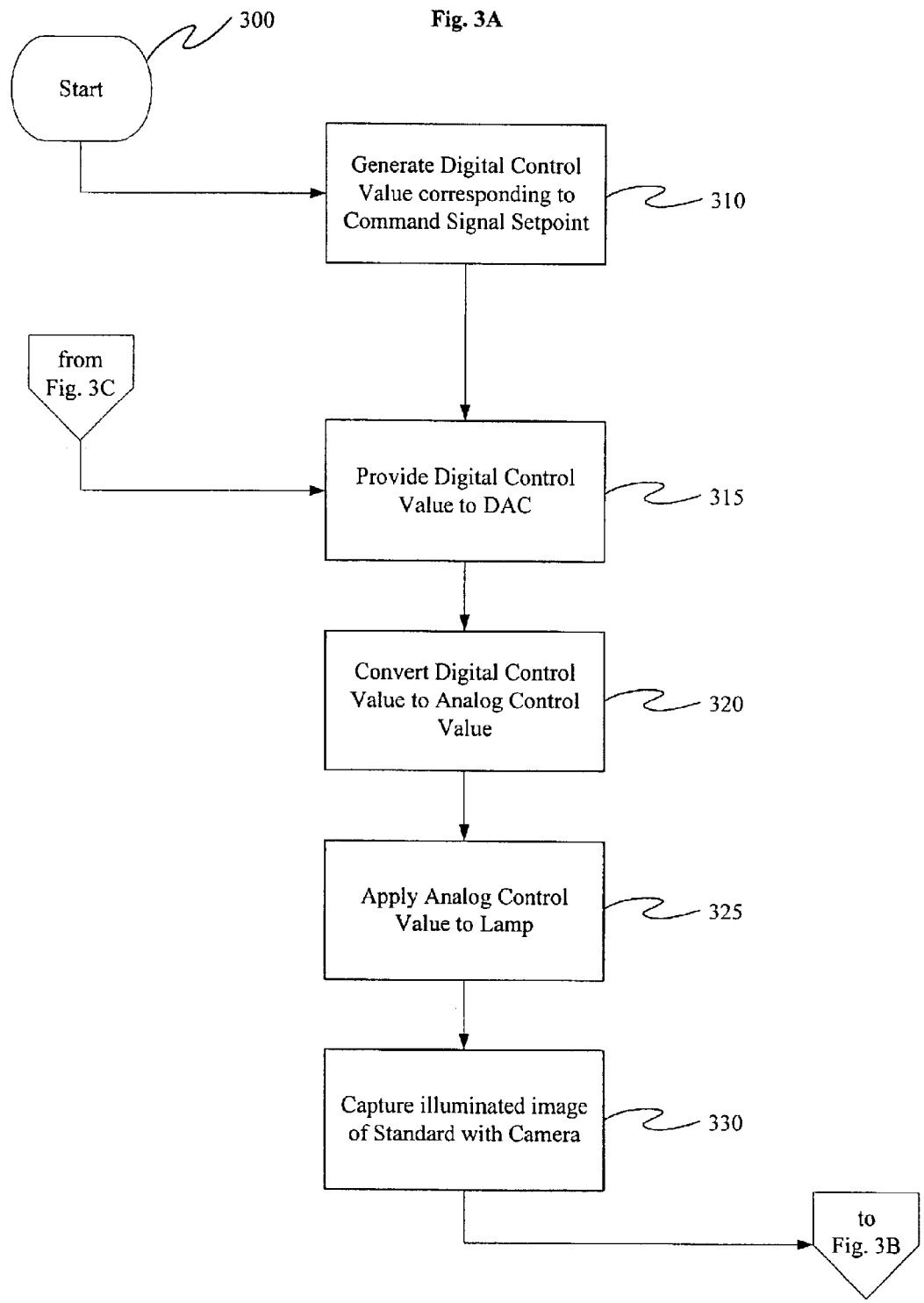

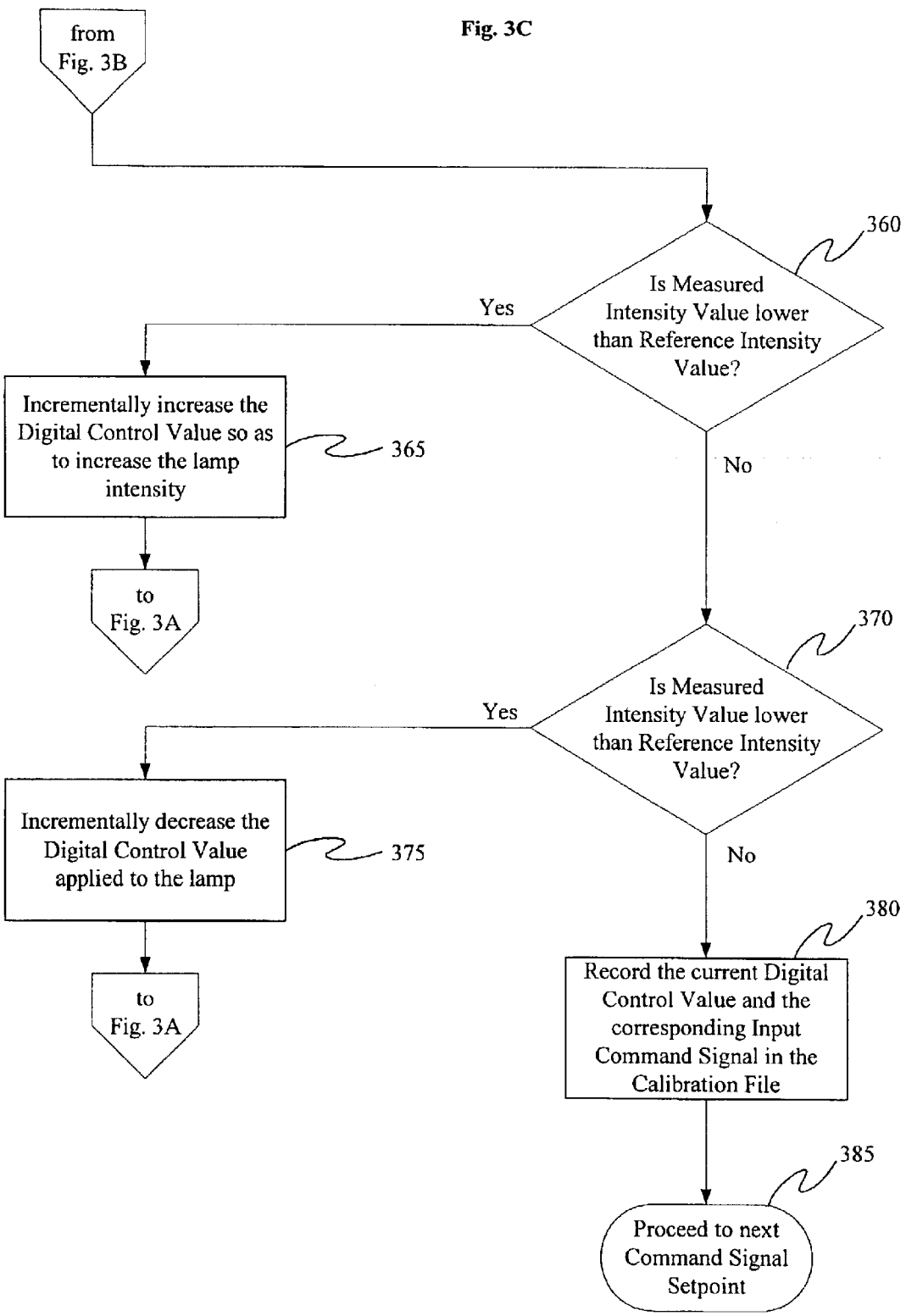

METHOD AND APPARATUS FOR CALIBRATING A MEASUREMENT SYSTEM

CROSS REFERENCE TO RELATED APPLICATION(S)

This application claims the benefit of the filing date of provisional patent application No. 60/335,135 entitled "Method and Apparatus for Calibrating A Measurement System," which has a filing date of Nov. 14, 2001 and which is hereby incorporated by reference.

REFERENCE TO COMPUTER PROGRAM SUBMITTED ON COMPACT DISC

A computer program listing appendix submitted on compact disc (in duplicate) is included and the material contained on the compact disc(s) is hereby incorporated by reference.

| Filename | Size | Type | Last Modified |
| --- | --- | --- | --- |
| Patent Application | 74 KB | File Folder | Nov. 14, 2002 |
| LightCalDialog.cpp | 45 KB | ASCII text file | Nov. 14, 2002 |
| LightCalDialog.h | 4 KB | ASCII text file | Nov. 14, 2002 |
| LightSource.cpp | 20 KB | ASCII text file | Nov. 14, 2002 |
| LightSource.h | 3 KB | ASCII text file | Nov. 14, 2002 |

COPYRIGHT NOTICE

A portion of the disclosure of this application, particularly the source code provided on the accompanying Compact Disc contains material that is subject to copyright protection. The copyright owner has no objection to the photographic reproduction of this patent document or the patent disclosure, as it appears in the Patent and Trademark Office patent file or records, but otherwise reserves all rights whatsoever.

BACKGROUND

Technology has advanced to the stage where a variety of objects are constructed with sub-micron features. For example, computer processors are now designed with sub-micron dimensions. And, a new class of medical devices, known as "micro-medical" devices, also includes sub-micron components.

Quality control and other inspections must be completed on these miniature features. However, measurement systems capable of sub-micron inspection require their own complex technology. These devices generally include a high-powered microscope and extremely precise positioning equipment. Illumination systems, that include one or more lamps, provide the necessary light. However, variations in lamp intensity can cause measurement differences in otherwise identical parts. These illumination variations might occur when replacing lamps, when a lamp ages, or when measuring otherwise identical parts on different systems. What is true for lamps is also true for cameras and optics. One camera may not yield the same results as another on a given measurement system. Therefore, a need exists for a method and apparatus for calibrating a measurement system that will enable consistent measurements.

BRIEF SUMMARY

Disclosed herein is a measurement calibration system that compensates not only for lamp variations, but also for camera and optics variations, to allow consistent measurement to be made across various equipment. The calibration system can be readily implemented on a wide variety of precision measurement systems and can be ported from one measurement system to another. One embodiment of the measurement calibration system addresses the issue of variations between light sources by employing an automated lamp calibration system. One method of the system will calibrate existing or new lamps to match an established standard. In a preferred embodiment, the method will generate a reference table, for a measurement system defined as the standard, to act as the reference for all measurement systems. The reference table may be in the form of a data file that may be subsequently copied to other measurement systems. The reference table can then act as a global standard for other measurement systems, including future systems not yet made. These and other features and advantages of the calibration system will be appreciated from review of the following detailed description of the invention, along with the accompanying figures in which like reference numerals refer to like parts throughout.

BRIEF DESCRIPTION OF THE DRAWINGS

FIGS. 2A and 2B depict a process flow diagram that describes a process in which a calibration file is utilized to make consistent, precision measurements.

FIGS. 3A, 3B and 3C depict a process flow diagram that describes one embodiment of a process for generating a revised calibration file.

DETAILED DESCRIPTION

Figure 1:
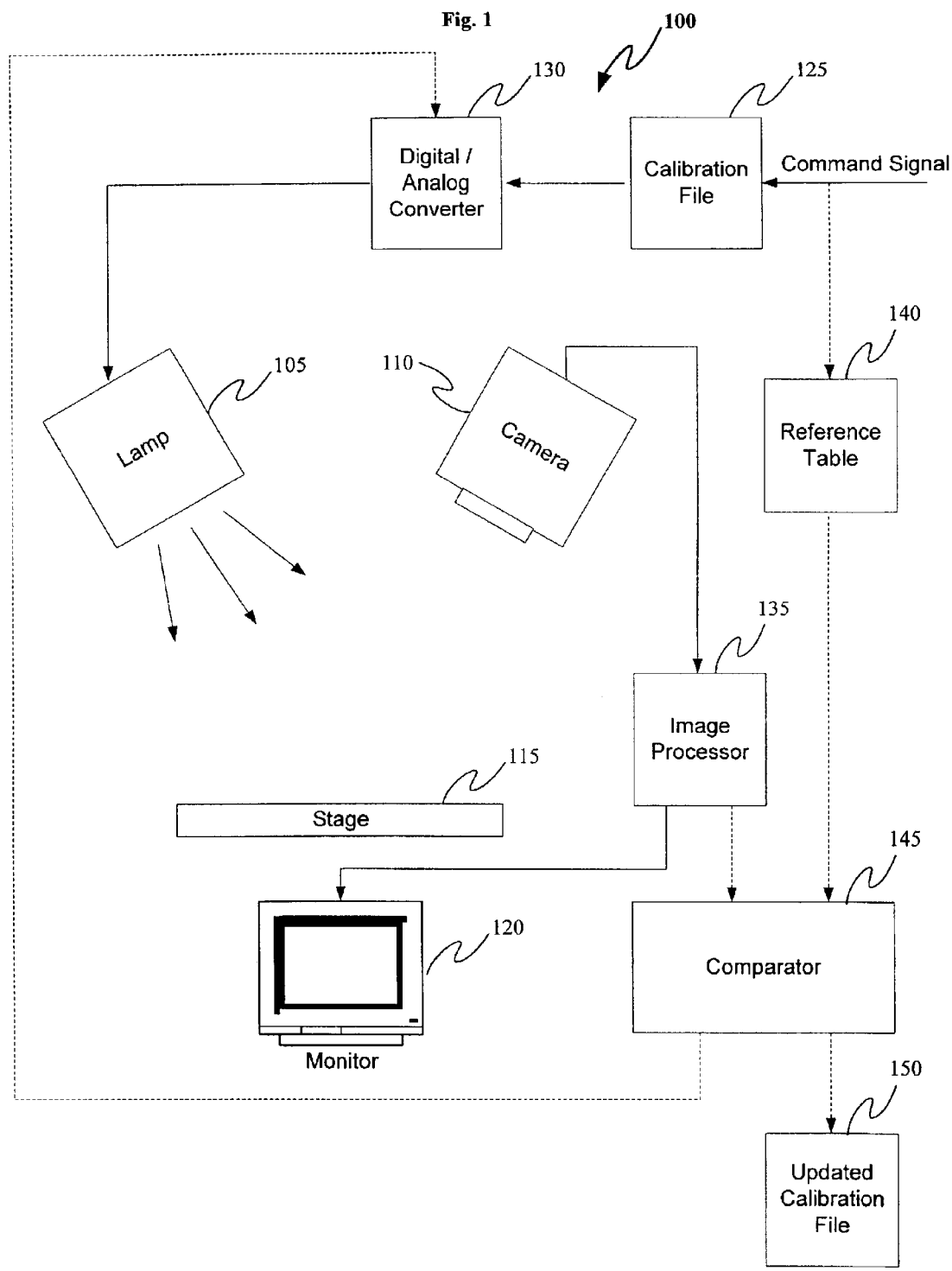
FIG. 1 is a block diagram depicting several components of one embodiment of a measurement calibration system.

In the following paragraphs, an improved measurement calibration system will be described in detail by way of example with reference to the attached drawings. Throughout this description, the preferred embodiment and examples shown should be considered as exemplars, rather than as limitations on the present invention. As used herein, "the present invention" refers to any one of the embodiments or equivalents of the invention described herein.

One embodiment of the calibration system addresses, for example, the issue of variations between light sources by employing an automated lamp calibration system. One method of the calibration system will calibrate existing or new lamps 105 to match an established standard. Preferably, the calibration operation will be capable of functioning within the range of approximately 10% to approximately 80% full-scale illumination of the lamp or lamps 105.

In a preferred embodiment, the method will generate a reference table 140, for a measurement system 100 defined as the standard, to act as the reference for all measurement systems. The reference table 140 may be in the form of a data file that may be subsequently copied to other measurement systems. The reference table 140 can then act as a global standard for other measurement systems, including future systems not yet made.

Once the reference table is created, the measurement system 100 can perform an adjustment operation on any lamps 150, old or new, to match their output to the reference table 140. This is done by creating a calibration file 125 specific to each lamp 105, and adjusting the lamp control signal to match the standard. In one embodiment, the calibration file 125 will match the output of the lamp 105 to the standard for values between approximately 10% and approximately 80% full scale. The values below approximately 10% full scale, and above approximately 80%, are reserved to allow headroom to adjust for variations and aging in individual lamps.

For example, after calibration, if an operator selects 44% illumination, the lamp intensity measured by the camera 110 will match the intensity specified in the reference table 140 for that command signal setting within a few A/D counts. If all systems are so calibrated, then for the example setting, the operator's system will match all systems within a few counts. This calibration feature will also calibrate for variations between cameras 110 or anything else in the optical path, ensuring that measurements will not vary from lamp to lamp, or from camera to camera, or from instrument to instrument.

The problem is to ensure that when measuring a given part or object, variations in lamp intensity do not cause measurement differences in otherwise identical parts. These illumination variations might occur when replacing lamps 105, when a lamp 105 ages, or when measuring otherwise identical parts on different measurement systems 100. What is true for lamps 105 is also true for cameras 110 and optics. One camera 110 may not yield the same results as another on a given machine. In a preferred embodiment, the calibration process will be semi-automated or automated.

The calibration system 100 can also be retrofitted into existing measurement systems to perform the new calibration process. Generally, the existing lamp control and bulb lamphouse will be replaced with a 12 bit DAC board, and two or more commercial, CE certified lamphouses, such as FOSTEC lamps with remote 0–5 VDC analog control inputs, will be installed. One embodiment will provide an operator command control comprising a 0–100% on/off control with a resolution of 1 part in 100, and transparent to the operator, the lamp control will be mapped to 4,095 (12 bit) DAC values. This permits the lamp 105 to be controlled by the operator or software with precise resolution. This gives backward compatibility to users and preserves the existing interface, but it allows the software to "map" new lamps or re-map aging lamps so they will all behave per the desired measurement standard.

Another embodiment of the calibration system uses one or more neutral density filters and/or gray reflective standards to assist in calibrating the lamps 105. The filters will attenuate the lamp 105 output at higher intensities that might otherwise saturate the camera 110. Intense back-light illumination will be viewed through neutral density filters. Intense top light illumination will be viewed from a calibrated gray reflector. In one embodiment, the exact values and natures of these filters and reflectors will be determined experimentally.

One aspect of the improved calibration system is depicted in FIG. 1. FIG. 1 is a block diagram depicting some of the relevant components of a measurement system. Some of these components, such as the lamp 105, camera 110, stage 115 and monitor 120, are implemented as hardware devices. Other components, such as the calibration file 125, the digital analog converter 130, the image processor 135, the reference table 140, the comparator 145 and the updated calibration file 150, can be implemented in either hardware or software means.

For background understanding, the operation of the measurement system will first be described with reference to FIG. 1 and FIGS. 2A & 2B. An object to be measured will first be placed on the stage 115. Based upon the needs of the operator or other measurement necessities, the object will be illuminated with a lamp 105 to facilitate precise measurements. It is contemplated that the lamp 105 can be implemented in a variety of ways including, for example, a vertical illumination device, a ring illumination device or a back-light illumination device. To further facilitate precise measurements, the intensity of the lamp may be precisely controlled. According to one embodiment, the intensity of the lamp may be varied among 100 different set points. These set points may correspond to a linear scale, an exponential scale, or a variety of other scales depending upon the needs of the measurement system. Accordingly, the measurement system 100 will be provided with an input command signal corresponding to one of these set points (205). The command signal is mapped on to a calibration file, which includes a look-up table of input command signals and corresponding digital control values (210). For example, an input command signal of 10 may correspond to a digital control value of 369. An exemplary calibration file 125 is included in the following Table 1.

TABLE 1

| Command Setpoint | Digital Control Value | Step |
|---|---|---|
| 0 | 0 | // Step 0 |
| 10 | 369 | // Step 1 |
| 20 | 802 | // Step 2 |
| 30 | 1227 | // Step 3 |
| 40 | 1716 | // Step 4 |
| 50 | 2080 | // Step 5 |
| 60 | 2588 | // Step 6 |
| 70 | 3032 | // Step 7 |
| 80 | 3759 | // Step 8 |
| 90 | 4095 | // Step 9 |
| 100 | 4095 | // Step 10 |

The digital control value corresponding to the command signal is subsequently provided to a digital analog converter 130 (215). The digital analog converter 130 converts the digital control value into an actual voltage to be applied to the lamp 105 (220, 225). In this manner, the intensity of the light produced by the lamp 105 will directly correspond to the command signal received by the measurement system 100. The camera 110 will capture an image of the object resting on the stage 115 at the desired level of illumination (230). Depending upon the particular system, the image may be further processed by an image processor 135 so that precise measurements can be calculated (235). A monitor 120 may be utilized to facilitate measurements of the object resting on the stage 115 (240). Accordingly, it can be seen that the calibration file 125 plays a crucial role in the measurement system by determining the proper intensity of illumination to be provided by the lamp 105. The process for generating an updated calibration file 150 will be described below.

Figure 3B:
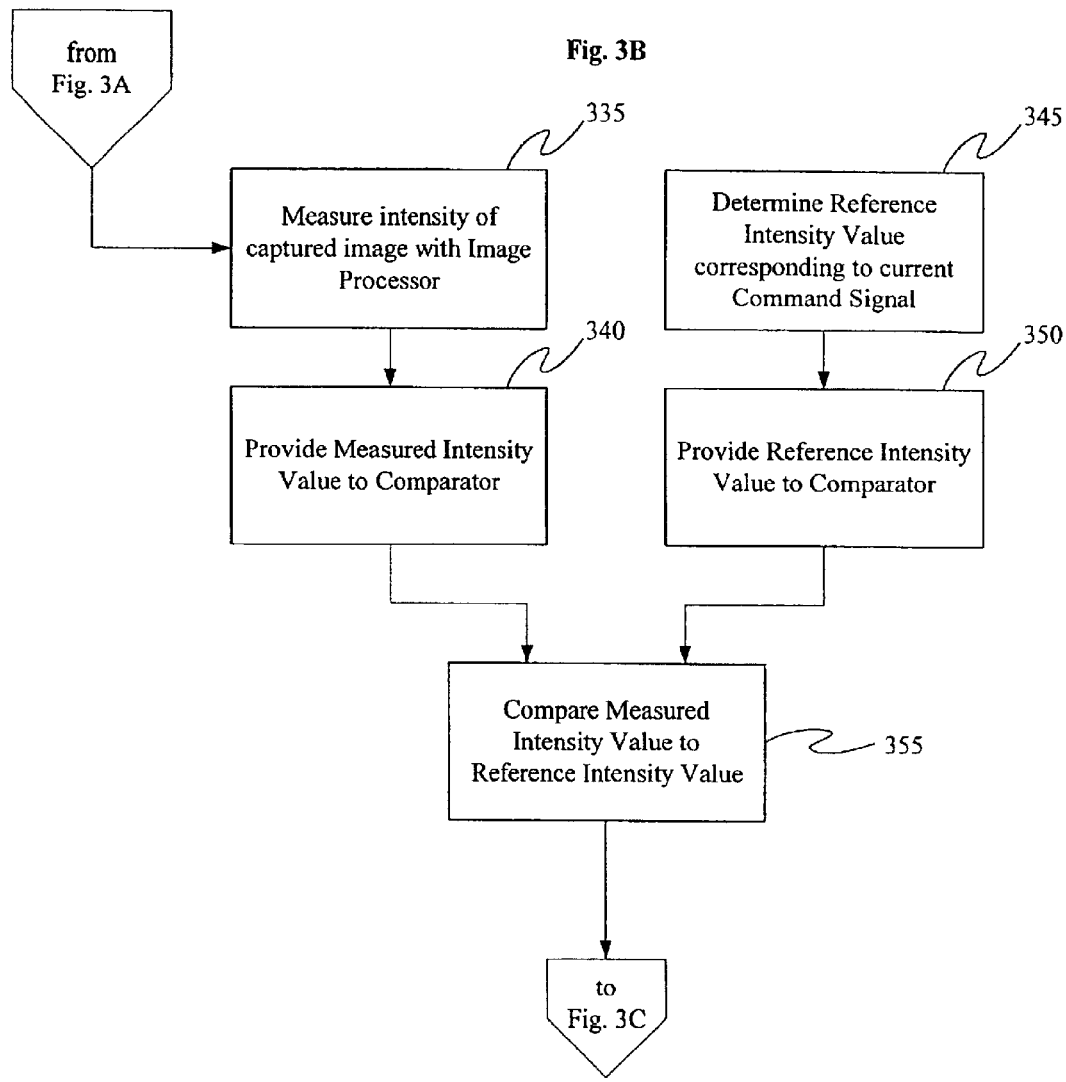

To generate an updated calibration file 150, many of the same components described above and depicted in FIG. 1 will be used. In addition, the components connected with the dashed lines in FIG. 1 will be utilized. Typically, a calibration file 125 comprises a plurality of command set points, as shown in Table 1 above. Therefore, the calibration process will be repeated for each desired command set point. To further illustrate this process, reference will be made to FIG. 1, and the process flow diagram depicted in FIGS. 3A–3C. The process starts (300) by generating a digital control value corresponding to a desired command signal set point (310). The desired command signal set point may be provided from an existing calibration file, or it can be generated on-the-fly by a software process. The digital control value will then be provided to a digital analog converter 130 to generate a corresponding analog control value (315, 320). The analog control value will be applied to the lamp 105 to generate illumination at a desired intensity (325). The illumination provided by the lamp 105 will be applied to a standard that is resting on the stage 115. The standard resting on the stage 115 can be adapted to the type of lighting that is being applied. For example, a vertical illumination arrangement will require a standard with relatively high reflectivity such as a glass surface. On the other hand, if the lamp 105 is provided as a back-light illumination source, then a reflective standard would not be desired. In fact, one or more neutral density filters may be required to be applied to the camera 110 to prevent saturation of the camera 110. According to another embodiment, if the lamp 105 is implemented as a ring illumination, a diffuse surface having three-dimensional features may be desired as a standard.

An illuminated image of the standard will be captured by the camera 110 so that a corresponding image signal will be generated (330). As previously described, the signal generated by the camera 110 may be processed by an image processor 135 so as to perform processes such as frame grabbing, digitization, or selection of certain areas within the captured image for measurement. The image processor 135 can also measure the intensity of the captured image (335). This measured intensity value will be provided to the comparator 145 (340). At the same time or previous to these measurements, the system will refer to a reference table 140 to determine a reference intensity value corresponding to the current command signal (345). A representative example of a reference table 140 is depicted below in Table 2.

TABLE 2

| Command Setpoint | Reference Intensity Value | Filter Instructions |
|---|---|---|
| 0 | 0.0000 | : |
| 10 | 53.7425 | :insert 0.5 nd filter |
| 20 | 44.0083 | : |
| 30 | 150.9708 | :insert 2.5 nd filter |
| 40 | 57.3172 | :insert 3.0 + 0.5 nd filters |
| 50 | 92.1128 | : |
| 60 | 163.8533 | : |
| 70 | 47.3972 | :insert 3.0 + 1.5 nd filters |
| 80 | 69.3544 | : |
| 90 | 97.0108 | : |
| 100 | 132.7714 | : |

The corresponding reference intensity value will also be provided to the comparator 145 (350). The comparator 145 will then compare the measured intensity value with the reference intensity value to determine if the current level of illumination provided by the lamp 105 is sufficient (355). If the measured intensity value is lower than the reference intensity value (360), then the comparator 145 will incrementally increase the digital control value so that the intensity of the lamp 105 will be incrementally increased (365). After a brief settling in time, the image intensity measurements will be repeated and another comparison to the reference value will be made (315–355). On the other hand, if the measured intensity value is lower than the reference intensity value (370), then the digital control value will be incrementally decreased so as to decrease the intensity of the lamp 105 (375). Similarly, after a brief settling in time, the process of measuring the intensity of image and comparing it with a reference intensity value will be repeated (315–355). Appropriate "centering" algorithms may be utilized to settle the lamp intensity at or near the desired reference intensity value.

If, however, the measured intensity value is within acceptable tolerances of the reference intensity value, then the current digital control value being applied to the digital analog converter 130 will be recorded along with its corresponding input command signal in an updated calibration file 150 (380). After this, the process repeats at the next command signal set point (385).

Although certain embodiments and aspects of the present inventions have been illustrated in the accompanying drawings and described in the foregoing detailed description, it will be understood that the inventions are not limited to the embodiments disclosed, but are capable of numerous rearrangements, modifications and substitutions without departing from the spirit of the invention as set forth and defined by the following claims and equivalents thereof. Applicant intends that the claims shall not invoke the application of 35 U.S.C §112, ¶6 unless the claim is explicitly written in means-plus-step or means-plus-function format.

I claim:

1. A method of generating a calibration file for use with a measurement system, the method comprising performing a) through k) for each of a plurality of command signal setpoints:
    a) generating a digital control value corresponding to the command signal setpoint;
    b) converting the digital control value to a corresponding analog control value;
    c) applying the analog control value to a light source whereby the intensity of the light source depends upon the analog control value;
    d) measuring the intensity of the light source with an image capturing device;
    e) providing a measured intensity value to a comparator;
    f) determining a reference intensity value corresponding to the command signal setpoint;
    g) providing the reference intensity value to the comparator;
    h) comparing the reference intensity value to the measured intensity value;
    i) if the measured intensity value is lower than the reference intensity value, then incrementally increasing the digital control value applied to the light source and repeating b).through h);
    j) if the measured intensity value is higher than the reference intensity value, then incrementally decreasing the digital control value applied to the light source and repeating b) through h); and
    k) if the measured intensity value is within the acceptable tolerances, then recording the current digital control value and the corresponding command signal setpoint in a calibration file.

2. A method according to claim 1,
    wherein incrementally increasing the digital control value and repeating b) through h) further comprises increasing the digital control value by a fixed increment until the measured intensity value is greater than the reference intensity value and then reducing the amount of the fixed increment; and
    wherein incrementally decreasing the digital control value and repeating b) through h) further comprises decreasing the digital control value by a fixed increment until the measured intensity value is lower than the reference intensity value and then reducing the amount of the fixed increment.

3. A method according to claim 1 wherein measuring the intensity of the light source further comprises:
generating an electronic image of a standard with a digital camera;
frame grabbing the electronic image;
digitizing the electronic image;
selecting a portion of the digitized electronic image; and
measuring the intensity of the selected portion of the digitized electronic image.

4. A method according to claim 1 further comprising:
providing a standard for measuring intensity of light; and
wherein measuring the intensity of the light source further comprises measuring an amount of light reflected from the surface of the standard.

5. A method according to claim 4 wherein the standard comprises a reflective glass surface.

6. A method according to claim 4 wherein the standard comprises an opaque object.

7. A method according to claim 4 wherein the standard comprises a diffuse surface.

8. A method according to claim 1 further comprising providing a neutral density filter between the light source and the image capturing device so as to prevent saturation of the image capturing device.

9. A method according to claim 8 wherein providing a neutral density filter is performed in response to an instruction within a reference table.

10. A computer program product operable to calibrate the operation of a precision measurement instrument, the computer program product comprising a computer memory encoded with instructions for performing the a) through k) for each of a plurality of command signal setpoints:
   a) generating a digital control value corresponding to the command signal setpoint;
   b) converting the digital control value to a corresponding analog control value;
   c) applying the analog control value to a light source whereby the intensity of the light source depends upon the analog control value;
   d) measuring the intensity of the light source with an image capturing device;
   e) providing a measured intensity value to a comparator;
   f) determining a reference intensity value corresponding to the command signal setpoint;
   g) providing the reference intensity value to the comparator;
   h) comparing the reference intensity value to the measured intensity value;
   i) if the measured intensity value is lower than the reference intensity value, then incrementally increasing the digital control value applied to the light source and repeating b) through h);
   j) if the measured intensity value is higher than the reference intensity value, then incrementally decreasing the digital control value applied to the light source and repeating b) through h); and
   k) if the measured intensity value is within the acceptable tolerances, then recording the current digital control value and the corresponding command signal setpoint in a calibration file.

11. A computer program product according to claim 10, wherein the instructions for incrementally increasing the digital control value and repeating b) through h) further comprise increasing the digital control value by a fixed increment until the measured intensity value is greater than the reference intensity value and then reducing the amount of the fixed increment; and
wherein the instructions for incrementally decreasing the digital control value and repeating b) through h) further comprise decreasing the digital control value by a fixed increment until the measured intensity value is lower than the reference intensity value and then reducing the amount of the fixed increment.

12. A computer program product according to claim 10 wherein the instructions for measuring the intensity of the light source further comprise:
frame grabbing an electronic image generated by the image capturing device;
digitizing the electronic image;
selecting a portion of the digitized electronic image; and
measuring the intensity of the selected portion of the digitized electronic image.

13. A computer program product according to claim 10 further comprising instructions for prompting an operator to provide a neutral density filter between the light source and the image capturing device in response to an instruction within a reference table.

* * * * *